(12) United States Patent
Schwerdtle

(10) Patent No.: US 6,847,148 B2
(45) Date of Patent: Jan. 25, 2005

(54) ARMATURE FOR AN ELECTRIC MACHINE AND METHOD FOR PRODUCING THE SAME

(75) Inventor: Martin Schwerdtle, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 140 days.

(21) Appl. No.: 10/148,439

(22) PCT Filed: Aug. 3, 2001

(86) PCT No.: PCT/DE01/02963
§ 371 (c)(1),
(2), (4) Date: Aug. 30, 2002

(87) PCT Pub. No.: WO02/31948
PCT Pub. Date: Apr. 18, 2002

(65) Prior Publication Data
US 2004/0108788 A1 Jun. 10, 2004

(30) Foreign Application Priority Data
Oct. 7, 2000 (DE) ........................................ 100 49 699

(51) Int. Cl.[7] .............................................. H02K 3/48
(52) U.S. Cl. ....................................... 310/214; 310/261
(58) Field of Search ................................ 310/214, 216, 310/261, 262, 264

(56) References Cited

U.S. PATENT DOCUMENTS

| | | | | |
|---|---|---|---|---|
| 1,808,749 A | * | 6/1931 | Apple | 310/201 |
| 4,757,601 A | * | 7/1988 | Leech et al. | 29/597 |
| 4,829,206 A | * | 5/1989 | Honshima et al. | 310/214 |
| 4,876,473 A | * | 10/1989 | Tanaka et al. | 310/216 |
| 4,896,066 A | * | 1/1990 | Tomite | 310/214 |
| 5,864,193 A | * | 1/1999 | Katoh | 310/214 |
| 6,137,201 A | * | 10/2000 | Umeda et al. | 310/179 |
| 6,242,835 B1 | * | 6/2001 | Uemura et al. | 310/214 |
| 6,376,963 B1 | * | 4/2002 | Furuya et al. | 310/269 |

FOREIGN PATENT DOCUMENTS

| | | |
|---|---|---|
| DE | 26 27 647 A | 1/1977 |
| DE | 28 48 618 A | 5/1980 |
| EP | 0 297 278 A | 1/1989 |

* cited by examiner

Primary Examiner—Dang Le
(74) Attorney, Agent, or Firm—Michael J. Striker

(57) ABSTRACT

The invention concerns an armature for an electrical machine, in particular for an electrical starter, having a ferromagnetic main body in which at least one axially extending groove is arranged, in which said groove at least one electrical conductor is accommodated in the longitudinal groove length.

It is provided that the armature (1) comprises at least one groove edge region element (8) formed and/or displaced by means of mechanical deformation of the main body (2) and acting upon the electrical conductor (4) for the purpose of defined positioning and/or fixation.

The invention further concerns a method for producing an armature for an electrical machine.

20 Claims, 4 Drawing Sheets

ARMATURE FOR AN ELECTRIC MACHINE AND METHOD FOR PRODUCING THE SAME

The invention concerns an armature for an electrical machine, in particular for an electrical starter, and a method for producing it.

BACKGROUND OF THE INVENTION

Armatures of the type mentioned here are known. They contain an armature winding and a ferromagnetic main body. The main body comprises axially extending grooves distributed around the circumference. The cross sections of these grooves can have various designs, and they are suited for accommodating electrical conductors of the armature winding. Armatures of this type often have an impermissibly high unbalance. As a result, their concentric-running properties are not satisfactory.

SUMMARY OF THE INVENTION

The armature according to the invention is unusual in that at least one groove edge region element is provided, which said groove edge region element is formed and/or displaced by means of mechanical deformation of the main body and which said groove edge region element acts upon the electrical conductor to position and/or fix it in defined fashion. Due to this groove edge region element formed and/or displaced by means of a mechanical deformation of the main body, it is possible in simple fashion to align an electrical conductor accommodated in the groove such that an unbalance caused by a misplacement of the conductor or undesired motional play of the conductor in the groove when the armature rotates is reduced or prevented. The groove edge region element forces the conductor into a defined position and/or a fixed position in the interior of the groove. Fixation can be achieved, for example, in that the conductor is pressed by the groove edge region element against at least one groove wall and/or the bottom of the groove.

It is preferably provided that the groove extends to a jacket surface of the main body or reaches into the vicinity of the jacket surface, and that the groove edge region element is located in the vicinity of the jacket surface. The existing groove edge region element is therefore easily accessed by a deformation tool to achieve a mechanical deformation.

It is further provided that the cross section of the groove is designed in the shape of an oblong hole, and that the longitudinal axis of the oblong hole extends in the radial direction of the armature. Due to the oblong-hole-shaped design of the groove, it is possible that a plurality of conductors can be accommodated in the groove and, in fact, in such a fashion that the conductors are arranged substantially on the longitudinal axis and adjacent to each other. Due to the arrangement of the oblong hole in the radial direction of the armature, only one conductor is acted upon by the groove edge region element in the case of this embodiment in order to bring the conductor accommodated in the groove into a defined position and/or a fixed position. The conductor acted upon by the groove edge region element is thereby pressed tightly against the next-nearest conductor in the oblong-hole-shaped groove until both conductors bear against each other. This procedure is repeated in succession from one conductor lying radially outwardly in the groove to a radially inwardly lying conductor situated directly adjacent to and at a distance from said radially outwardly lying conductor.

The groove edge region element is advantageously designed integral with the main body. It is likewise possible that the groove edge region element is designed as a separate component. A mechanical linkage with the main body is obtained in this case by the fact that the groove edge region element is fitted into the groove, for example, or it is screwed together with the groove using screws. In contrast to this multiple-component embodiment, the single-component design of the groove edge region element with the main body can be produced less expensively.

It is provided that the groove edge region element extends along the entire length of the groove. Alternatively, it is further provided that a plurality of groove edge region elements is distributed along the length of the groove, because, in practice, it is often sufficient for the conductor to be acted upon only in zones.

It is further provided that the groove comprises a bottom, two side walls, and an opening, and that the groove edge region element is situated in the region of at least one transition from a side wall to the opening. The groove edge region element can be situated on the one side wall or on the side wall of the groove opposite to this in the region of the transition from the respective side wall to the opening. Alternatively, it is possible that each of the two side walls comprises one groove edge region element, i.e., that two groove edge region elements are provided for the purpose of defined positioning and/or fixation of the conductors in the groove.

According to a preferred embodiment, the diameter inside the opening delimited by the groove edge region element is smaller than the diameter or the breadth of the conductor. The delimitation of the opening formed by the groove edge region element is therefore designed such that the conductor is prevented from falling out of the groove. Furthermore, with regard for the desired deformation, the delimitation of the opening by the groove edge region element represents a design that is favorable in terms of deformation.

It is preferably provided that the groove edge region element is designed in the shape of a lip—delimiting the opening—or in the shape of a bridge—extending from one side wall to the other side wall. In the case of a bridge-like design of the groove edge region element, the groove is closed in the region of the jacket surface of the main body. Due to such a groove-closing design of the groove edge region element, not only is the defined positioning and/or fixation of the conductor accommodated in the groove possible, but magnetic flux is improved as well as compared to groove edge region elements designed in the shape of a lip, the use of which allows the groove to remain open in the region of the jacket surface of the main body.

According to a further development of the armature, it is provided that the groove edge region element has a thickness of 0.1 mm to 0.5 mm, preferably 0.3 mm. With such a thickness, the magnetic flux can be increased slightly, e.g., by means of an enlargement of the main body surface brought about by the groove edge region element, without increasing the current flow between two tips of teeth formed by the groove in the cross section of the main body. To obtain a high magnetic flux in the case of a groove edge region element designed in the shape of a bridge, a thickness of approximately 0.3 mm must be adhered to in the region of the longitudinal axis of the groove, preferably along the entire length of the groove.

It is preferably provided that the groove edge region element is designed bulged or essentially straight in shape. The groove edge region element can thereby be designed— as viewed in the radial direction of the armature—bulged inwardly or outwardly. The shape of the bulge can vary as well. The bulge as well as the substantially straight shape of the groove edge region element are basically produced by the tool used to produce the armature.

In producing the main body, the cross section of the groove is to be designed larger than the conductor to be accommodated in the groove so that the conductor can be placed in the groove. As a result, the conductor has motional play after it has been placed in the groove. Said motional play creates an unbalance in the armature during rotation in the case of armatures described in the prior art. In the case of the armature according to the invention, the cross section of the groove is changed by means of mechanical deformation such that the conductor does not have any motional play in the groove, or its motional play is at least reduced. In order to obtain a particularly advantageous design of the armature according to the invention, it is provided that the groove edge region element rises above the periphery of the main body before deformation. Due to this design of the groove, it is possible for the diameter of the main body to be designed reduced in size and, in fact, to the extent that the groove is flattened and mushroomed over in the radial direction of the main body by means of the deformation of the groove edge region element. Due to the smaller diameter of the main body, it is advantageously possible to build the entire armature more compact in size and lighter in weight. Furthermore, the main body has a lower mass moment of inertia, which allows the armature to be operated with less wear. An arrangement of the groove such that it rises above the periphery of the main body before deformation also makes it possible for the groove to be displaced outwardly as viewed in the radial direction of the armature. As long as the distances between the grooves distributed around the circumference of the main body remain unchanged when the groove position is displaced in this fashion, the groove can be designed wider in size. This allows conductors having a greater diameter to be inserted. As long as the width of the groove remains unchanged when the groove position is displaced in this fashion, it is possible to increase the distance between the grooves distributed around the circumference of the main body, i.e., the tooth width of the main body, in accordance with the play-reducing displacement of the groove edge region element.

It is further provided that the groove edge region element designed in the fashion of bridge comprises at least one notch before deformation. When the groove edge region element is deformed, distortions occurring on the groove edge region element can therefore be reduced advantageously while eliminating the notches.

The method according to the invention is unusual in that initially at least one electrical conductor is placed in at least one groove situated in a main body of the armature, and that the conductor is then positioned and/or fixed in the groove in defined fashion by means of mechanical deformation of a groove region. Due to the defined positioning and/or fixation of the conductor in the groove, a reproducible and precise arrangement of the conductor in the groove is possible. The method according to the invention is particularly suited to reducing or preventing such unbalance in the armature. This unbalance is caused by an uncontrolled position of a conductor accommodated in the groove with motional play. Using the method, it is possible in simple fashion—by adjusting the deforming force—to variably adjust an intensity of deformation that is sufficient to obtain a desired positioning and/or fixation of the conductor in the groove.

The deformation advantageously takes place in the region of the periphery of the main body. This allows the groove region to be deformed using a relatively low amount of force in such a fashion that the conductor placed in the groove is positioned and/or fixed in defined fashion.

A conductor-retaining element is preferably formed in the groove by means of the deformation. Using this conductor-retaining element, it is possible to bring the conductor or conductors accommodated in the groove into a defined position and to hold the conductors in this position when the main body is rotated. The creation of such a conductor-retaining element is possible in particular when an armature is used, the main body of which comprises a groove edge region element in the edge region of the groove, or when the main body makes it possible to form such a groove edge region element.

According to a further development of the method, it is provided that the conductor-retaining element in existence on the main body is moved into a conductor-retaining position by the act of deformation. This displacement can take place in such a fashion that the conductors are brought into direct contact with each other and/or that they come to rest at the bottom of the groove or against the walls of the groove.

The deformation is obtained preferably by means of caulking using a pressing tool, preferably by means of at least one punch. Other methods of cold forming (e.g., stamping or pressing) may be used as well.

Further exemplary embodiments of the method result from the dependent claims.

BRIEF DESCRIPTION OF THE DRAWINGS

The invention is explained in greater detail below using various exemplary embodiments with reference to associated drawings.

DETAILED DESCRIPTION OF THE PREFERRED EMBODIMENTS

Figure 1:
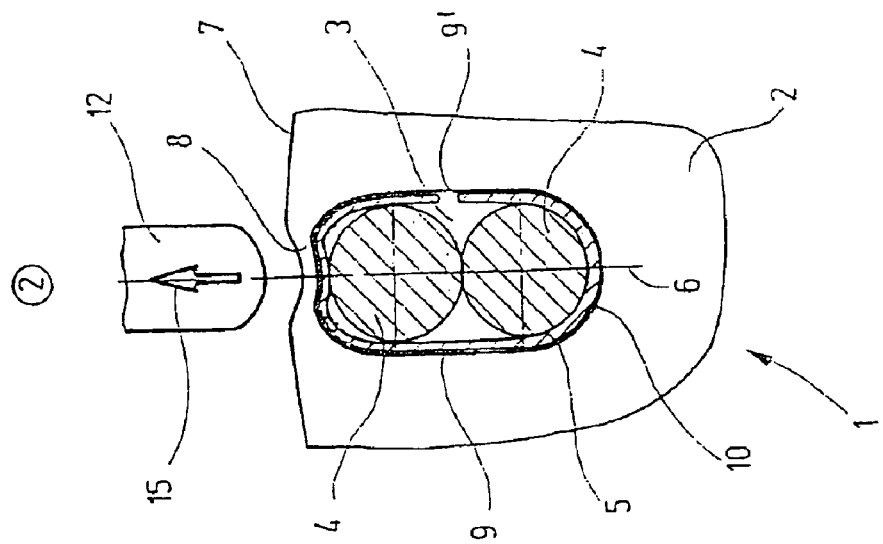
FIG. 1 shows a cross-cut armature groove having a groove edge region element designed in the shape of a bridge before and after deformation according to a first exemplary embodiment.
Figure 1:
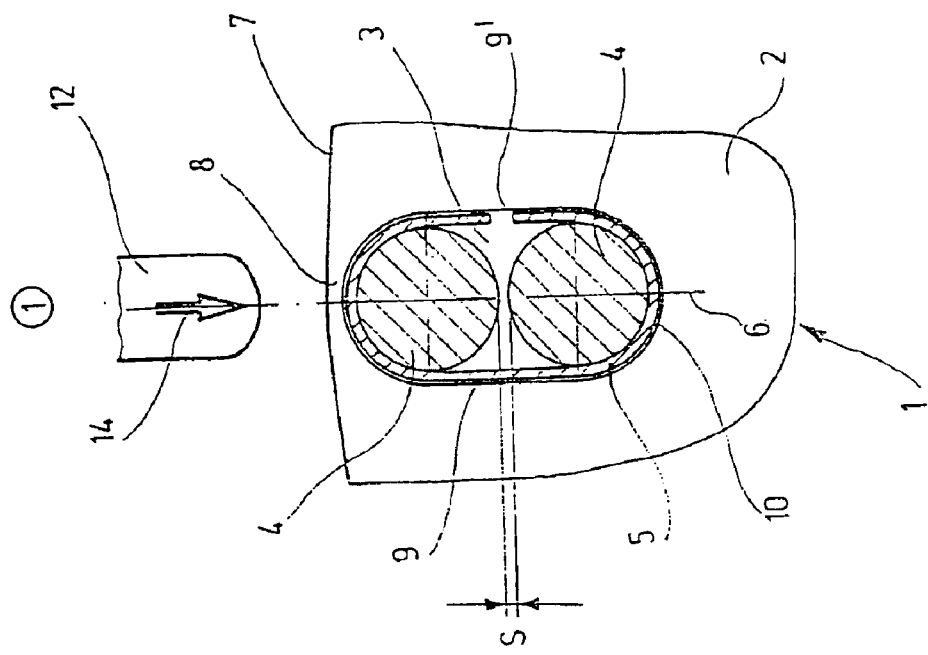

A detailed region of an armature 1 is shown in FIG. 1, which said region shows a main body 2 of the armature 1 with a groove 3 situated in the main body 2 and two electrical conductors 4 accommodated in the groove 3. The groove 3 has the shape of an oblong hole, and the longitudinal axis 6 of the groove 3 extends in the radial direction of the main body 2. An insulating element 5 designed in the shape of a sleeve is situated in the groove 3, which said insulating element adapts to the walls of the groove 3, and within which said insulating element the two electrical conductors 4 are located. The cross section of the conductors 4 in this exemplary embodiment are designed round in shape. The longitudinal axis 6 of the groove 3 extends in the radial direction of the armature 1 in such a fashion that it reaches into the vicinity of the jacket surface 7 of the main body 2. In the region of this jacket surface 7, the cross section of the groove 3 is designed closed by means of a groove edge region element 8 that extends from one side wall 9 to an opposite side wall 9' of the groove 3 in the shape of a bridge in this exemplary embodiment. The groove edge region element 8 is integrally connected to the main body 2.

Position one (illustration on the left-hand side of the page) shows the armature 1 before deformation. The two electrical conductors 4 accommodated in the groove 3 have motional play S in relation to each other in the direction of the longitudinal axis 6 of the groove 3. This motional play S is required so that the conductors 4 can be placed in the groove 3. The cross section of the groove 3 is therefore designed larger in size than the two conductors 4. In order to decrease the motional play S and avoid it entirely if necessary, the groove edge region element 8 is deformed. To produce this deformation of the groove edge region element 8, a punch 12 is moved from a starting position in the direction of the groove edge region element 8 as indicated by the arrow 14.

The armature 1 deformed by means of the punch 12 is shown in position two in FIG. 1 (illustration on the right-hand side of the page). The punch 12 was pressed against the groove edge region element 8 in such a fashion that said groove edge region element comprises an inwardly-bulging deformation. The bulge is created by the shape of the punch 12 in the region of the punch. Due to this deformation of the groove edge region element 8, direct contact is established between the two electrical conductors 4, between the bottom of the groove 10 and the conductor 4 closest to said bottom of the groove, and between the groove edge region element 8 and the conductor 4 closest to said groove edge region element. The electrical conductors 4 are therefore situated free of motional play in the direction of the longitudinal axis 6 of the groove 3 and, in fact, in such a fashion that fixation of the electrical conductors 4 is guaranteed when the armature 1 is rotated. The deformation created by means of the punch 12 remains when the punch 12 is moved back into the starting position as indicated by the arrow 15.

Figure 2:
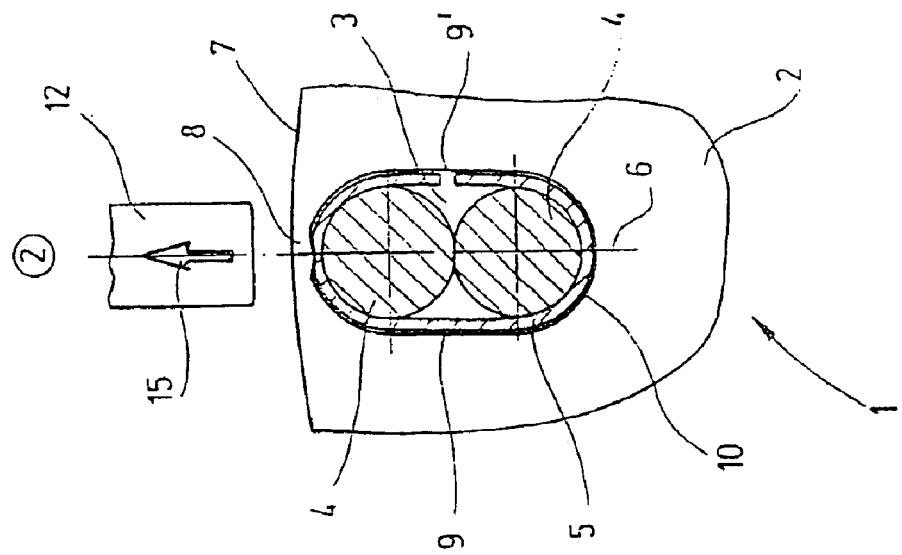
FIG. 2 shows a cross-cut armature groove having a groove edge region element designed in the shape of a bridge before and after deformation according to a second exemplary embodiment.
Figure 2:
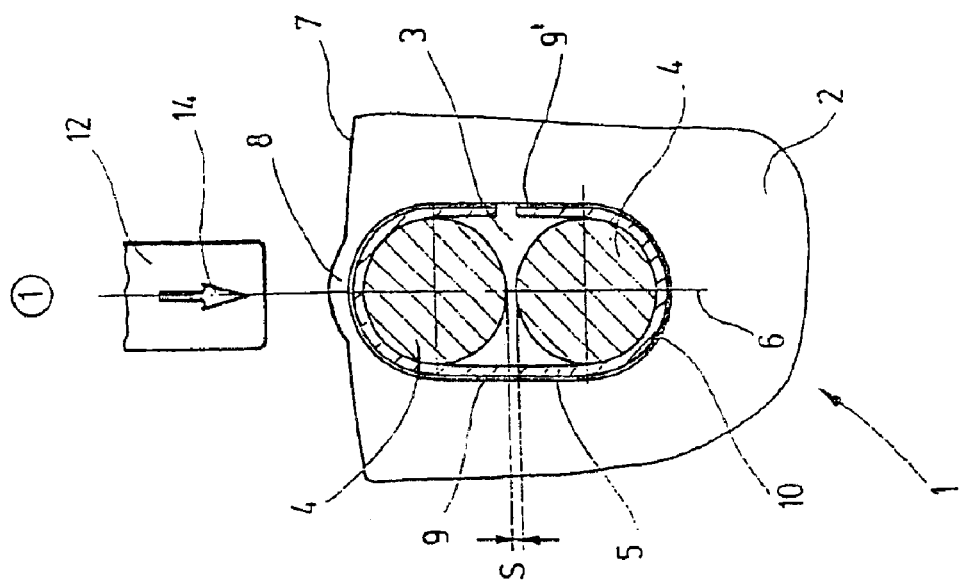

FIG. 2 shows the armature 1 according to a second exemplary embodiment. Identical parts are labelled with identical reference numbers. Reference is therefore made to the description of FIG. 1 in this regard. In contrast to FIG. 1, the groove edge region element 8 in the exemplary embodiment shown here is situated before deformation (see position one) such that it rises above the periphery of the main body 2. In this arrangement, the groove edge region element 8 is designed so that the inside of the groove edge region element 8, i.e., the side facing the bottom of the groove 10, adjusts to the contour of the closest electrical conductor 4. Due to this design of the groove edge region element 8 in which it rises above the periphery of the main body 2, the diameter of the main body 2 in this exemplary embodiment is designed to be smaller than in the exemplary embodiment according to FIG. 1. The cross section of the armature 1 shown here therefore has a more compact design. The groove edge region element 8 is deformed by means of the punch 12—which is designed straight in shape in the punching region—in such a fashion that the groove edge region element 8, in the deformed state (see position two), is located in the periphery of the main body 2.

According to a not shown exemplary embodiment, the groove edge region element 8 rises above the periphery of the main body 2, as in the exemplary embodiment shown in FIG. 1. This projection is created in that the position of the groove 3 is displaced outwardly—as viewed in the radial direction of the main body 2—by the amount of motional play S of the conductor 4 accommodated in the groove 3. The diameter of the main body 2 remains unchanged in this exemplary embodiment and corresponds to the diameter of the main body 2 shown in the exemplary embodiment in FIG. 1. In the case of this not shown exemplary embodiment, here the two side walls 9, 9' of the groove 3 are further apart from each other than in the exemplary embodiments shown in FIGS. 1 through 4 due to the displacement of the groove position radially outwardly.

Figure 3:
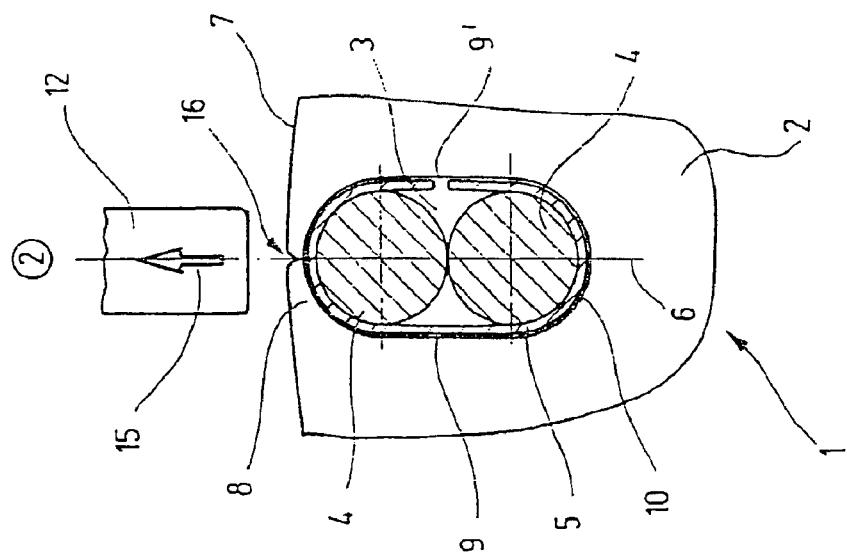
FIG. 3 shows a cross-cut armature groove having a groove edge region element designed in the shape of a bridge before and after deformation according to a third exemplary embodiment.
Figure 3:
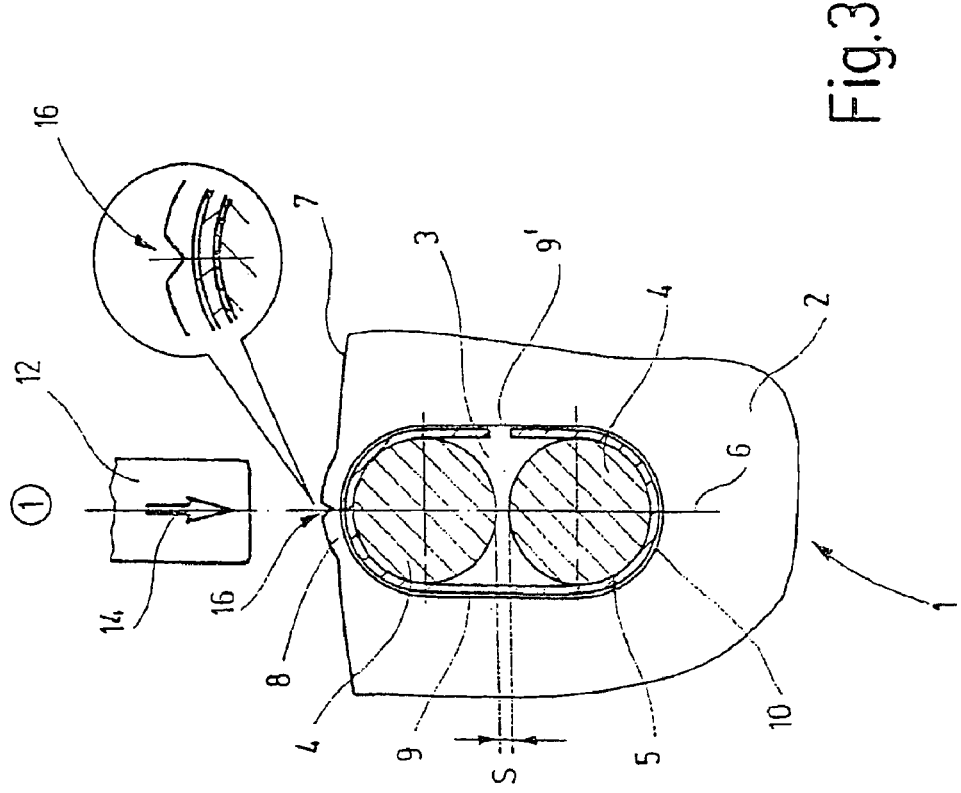

A further exemplary embodiment of the armature 1 is shown in FIG. 3. The parts that are identical to those shown in the preceding figures are labelled with the same reference numerals and will not be explained a second time. Before deformation (see position one), the groove edge region element 8 comprises a notch 16 having a V-shaped cross section on the side facing outwardly toward the punch 12. The notch 16 extends parallel to the cross section of the groove 3, and its tip extends through the longitudinal axis 6 of the groove 3. The notch 16 prevents distortions from forming when the groove edge region element 8 is deformed. The notch 16 having the V-shaped cross section applied in the non-deformed state is thereby forced together at its sides and, in fact, far enough that the notch 16 remains open only slightly. Since a magnetic flux over the sides of the notch having a V-shaped cross section is to be avoided, the sides are not brought into direct contact with each other.

Figure 4:
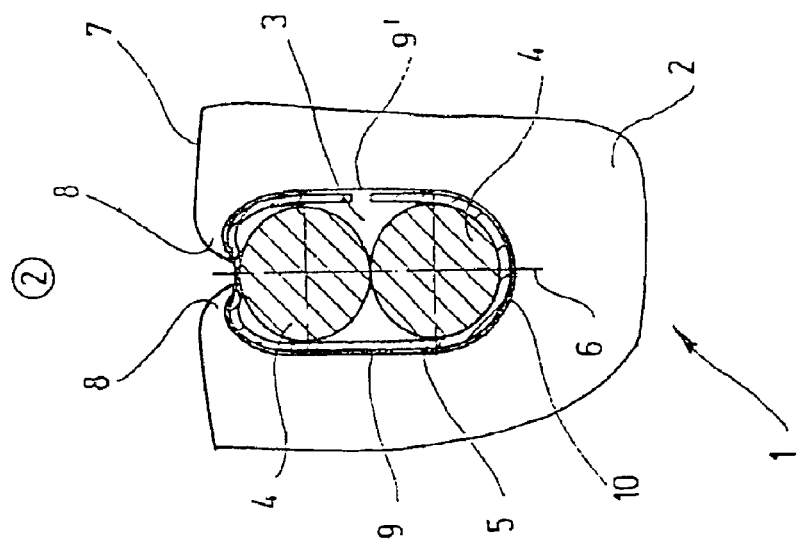
FIG. 4 shows a cross-cut armature groove having a groove edge region element designed in the shape of a lip before and after deformation.
Figure 4:
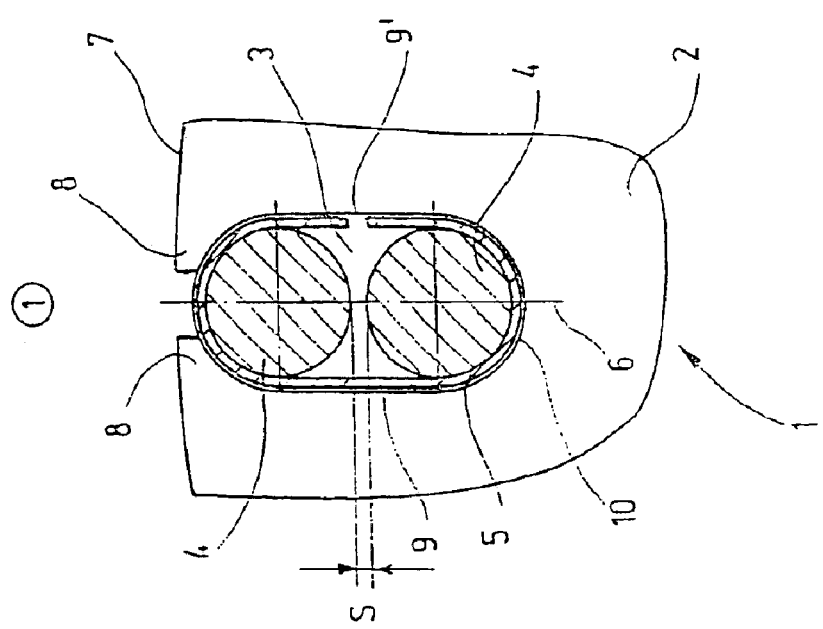

In the exemplary embodiment shown in FIG. 4, the groove 3 situated in the main body 2 is designed open in the region of the jacket surface 7. One groove edge region element 8 each designed in the shape of a lip is located in the region facing the jacket surface 7 of the main body 2 on each side wall 9, 9' of the groove 3, which groove edge region elements delimit the groove opening. The fixation of the two electrical conductors 4 accommodated in the groove 3 takes place in this exemplary embodiment by the fact that the two groove edge region elements 8 are deformed in the direction toward the bottom of the groove. The groove 3 thereby remains open to the outside.

What is claimed is:

1. An armature for an electrical machine in the form of an electrical starter, comprising:
    a ferromagnetic main body, wherein at least one axially extending groove is situated in the ferromagnetic main body, wherein in said groove, at least one electrical conductor is accommodated in a longitudinal groove length,
    further comprising at least one groove edge region element (8) formed and/or displaced by means of mechanical deformation of the main body (2) and acting upon the electrical conductor (4) for the purpose of defined positioning and/or fixation, wherein the groove edge region element (8) designed in the shape of a bridge comprises, before deformation, at least one notch (16).

2. The armature according to claim 1, wherein the groove (3) extends to a jacket surface (7) of the main body (2) or into the vicinity of the jacket surface (7), and wherein the groove edge region element (8) is located in the vicinity of the jacket surface (7).

3. The armature according to claim 1, wherein the cross section of the groove (3) is designed in the shape of an oblong hole, and wherein the longitudinal axis (6) of the oblong hole extends in the radial direction of the armature (1).

4. The armature according to claim 1, wherein the groove edge region element (8) is designed integral with the main body (2).

5. The armature according to claim 1, wherein the groove edge region element (8) extends along the entire length of the groove, or wherein a plurality of groove edge region elements (8) are arranged in distributed fashion along the length of the groove.

6. The armature according to claim 1, wherein the groove (3) comprises a bottom of the groove (10), two side walls (9, 9'), and an opening, and wherein the groove edge region element (8) is situated in the region of at least one transition from a side wall (9, 9') to the opening.

7. The armature according to claim 1, wherein the diameter inside the opening delimited by the groove edge region element (8) is smaller than the diameter/the breadth of the electrical conductor (4).

8. The armature according to claim 1, wherein the groove edge region element (8) is designed in the shape of a lip—delimiting the opening —or in the shape at a bridge—extending from one side wall (9) to the other side wall (9').

9. The armature according to claim 1, wherein the groove edge region element (8) has a thickness of 0.1 mm to 0.5 mm, preferably 0.3 mm.

10. The armature according to claim 1, wherein the groove edge region element (8) is plastically deformed in the direction toward the bottom of the groove (10).

11. The armature according to claim 1, wherein the groove edge region element (8) is designed bulged or substantially straight in shape.

12. The armature according to claim 1, wherein the groove edge region element (8), before deformation, is situated so that it rises above the periphery of the main body (2).

13. The armature according to claim 1, wherein the electrical conductor (4) is pressed against the bottom of the groove (10) and/or against adjacent electrical conductors (4).

14. An armature for an electrical machine in the form of an electrical starter, comprising:

a ferromagnetic main body, wherein at least one axially extending groove is situated in the ferromagnetic main body, wherein in said groove, at least one electrical conductor is accommodated in a longitudinal groove length, further comprising at least one groove edge region element (8) formed and/or displaced by means of mechanical deformation of the main body (2) and acting upon the electrical conductor (4) for the purpose of defined positioning and/or fixation, wherein the groove edge region element (8) is designed in the shape of an outwardly bulging bridge.

15. A method for producing an armature for an electrical machine, in particular according to claim 14, wherein, initially, at least one electrical conductor (4) is placed in at least one groove (3) situated in a main body (2) of the armature (1), and wherein the conductor (4) is then positioned and/or fixed in defined fashion in the groove (3) by means of deformation of a groove region.

16. The method according to claim 15, wherein the deformation takes place in the region of the periphery of the main body (2).

17. The method according to claim 14, wherein a conductor-retaining element is created in the groove (3) by means of the deformation.

18. The method according to claim 14, wherein a conductor-retaining element situated in the main body (2) is moved to a conductor-retaining position by means of the deformation.

19. The method according to claim 14, wherein the deformation is cold forming.

20. The method according to claim 14, wherein the deformation as caulking is produced by means of a pressing tool, preferably by means of at least one punch (12).

* * * * *